United States Patent [19]

Szugda

[11] 4,074,943
[45] Feb. 21, 1978

[54] WATERPROOF JOINT

[76] Inventor: Bernard Szugda, P.O. Box 159, Southbridge, Mass. 01550

[21] Appl. No.: 741,205

[22] Filed: Nov. 12, 1976

[51] Int. Cl.² .................................................. F16B 1/100
[52] U.S. Cl. .................................... 403/174; 403/205; 403/213; 52/396; 52/403
[58] Field of Search .............. 403/170, 174, 175, 178, 403/202, 203, 205, 207, 213, 287, 288, 403, 404, 406, 410; 52/396, 403, 573

[56] References Cited

U.S. PATENT DOCUMENTS

| 2,867,160 | 1/1959 | Wangerow | 52/396 X |
| 3,093,934 | 6/1963 | Underhill | 52/573 X |
| 3,172,237 | 3/1965 | Bradley | 52/396 X |
| 3,183,627 | 5/1965 | Rice | 52/396 |
| 3,254,463 | 6/1966 | Moseley | 52/753 X |
| 3,439,592 | 4/1969 | McAusland | 52/396 X |

FOREIGN PATENT DOCUMENTS 943,031  11/1963  United Kingdom ................... 52/396

*Primary Examiner*—Andrew V. Kundrat
*Attorney, Agent, or Firm*—Norman S. Blodgett; Gerry A. Blodgett

[57] ABSTRACT

Waterproof joint for field assembly consisting of two waterstops each having a planar face and a U-shaped junction member fastened to the faces of the water stops.

6 Claims, 6 Drawing Figures

WATERPROOF JOINT

BACKGROUND OF THE INVENTION

In the construction of concrete buildings and the like it is necessary, for a number of reasons, to pour the concrete in discrete sections. It is common practice to provide a waterstop in the joint between these sections. According to conventional practice, this waterstop consists of a ribbon of an elastomer material, one-half of which is embedded in the concrete of one section and the other half of which is embedded in the concrete of the immediately adjacent section. The waterstop in this way prevents the passage of water through the joint between the two concrete sections.

The waterstop network is laid in the forms before the concrete is poured and generally forms a continuous structure consisting of lengths of the waterstop band that are fastened together. Since the waterstop material only comes in lengths that can be easily handled and because the network is not continuously straight but must extend in various directions at the corners and joints in the building, it is necessary to cut the waterstop element and fasten it to a similar waterstop in various joint configurations. When the joint is an end-to-end connection, the customary procedure is to heat the ends of the waterstop (which is formed of a thermoplastic elastomer) and, while the ends are still in a molten material hardens and a continuous joint or weld is formed. While it is possible to make a butt joint in this manner, other types of junctions are not as easy to form, particularly where the waterstop extends in several directions from a given point. Furthermore, butt welding in this manner produces a very poor joint, because the operation must necessarily be performed in the field where conditions are not suitable for accurate heating and clamping. Furthermore, the use of a heating instrument to melt the thermoplastic means that dangerous fumes may be introduced into the air and breathed by the workmen who are assembling the waterstop. In other words, the old system of joining lengths of waterstop into a desired configuration is not only ineffective, but also dangerous. These and other difficulties experienced with the prior are devices have been obviated in a novel manner by the present invention.

It is, therefore, an outstanding object of the invention to provide a waterproof joint using a system for assembling waterstops that can effectively be used in the field.

Another object of this invention is the provision of a waterproof joint capable of field assembly under wet and dirty conditions.

A further object of the present invention is the provision of a waterproof joint for forming a junction in waterstops formed by a process which releases no dangerous fumes.

It is another object of the instant invention to provide a system for assembling waterstops in concrete construction in which the connections are strong and waterproof.

A still further object of the invention is the provision of waterproof joint that can be formed in the midst of concrete construction to provide effective waterproofing without danger to the workmen.

It is a still further object of the invention to provide a waterproof joint formed of elastomer materials which joint is simple in construction, which is inexpensive to use, and which is capable of a long life of useful service when buried in concrete and is, therefore, not available for maintenance.

It is still further object of the present invention to provide a waterproof joint system in which all necessary junctions of waterstops can be formed from a small number of standard elements without the necessity for cutting and shaping in the field.

With these and other objects in view, as will be apparent to those skilled in the art, the invention resides in the combination of parts set forth in the specification and covered by the claims appended hereto.

SUMMARY OF THE INVENTION

In general, the invention consists of a waterproof joint having a first and a second elongated waterstops formed of an elastomer material each having a planar face. A junction member of U-shaped conformation, also formed of an elastomer material, connects the two waterstops together with one leg fastened to the planar surface of one waterstop and the other leg fastened to the planar surface of the other waterstop.

More specifically, a strip metal plate lies along the surface of each leg which is opposite to the surface of the leg that lies against the corresponding planar surface and self-tapping screws extend through the plate and the junction member into the waterstop.

In some joint configurations, the planar surface of the waterstop is an end surface extending at right angles to its length. In some joint configurations it is a leg of the junction memeber that is attached to the waterstop and in others it is the bight of the junction member that is attached to the planar surface of a waterstop.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
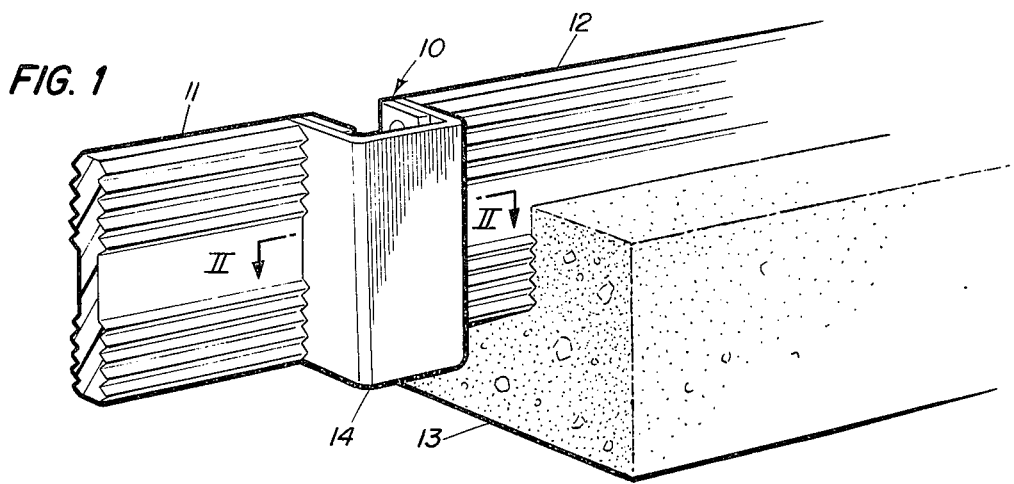
FIG. 1 is a perspective view of a waterproof joint embodying the principles of the present invention.

Referring first to FIG. 1, wherein are best shown the general features of the invention, the waterproof junction, indicated generally by the reference numberal 10, is shown as consisting of a first waterstop 11 and a second waterstop 12 connected by a junction member 14, all embedded in a concrete structure 13 and with the other half extending from that structure in position to have the next adjacent section of the concrete structure poured around it.

Figure 2:
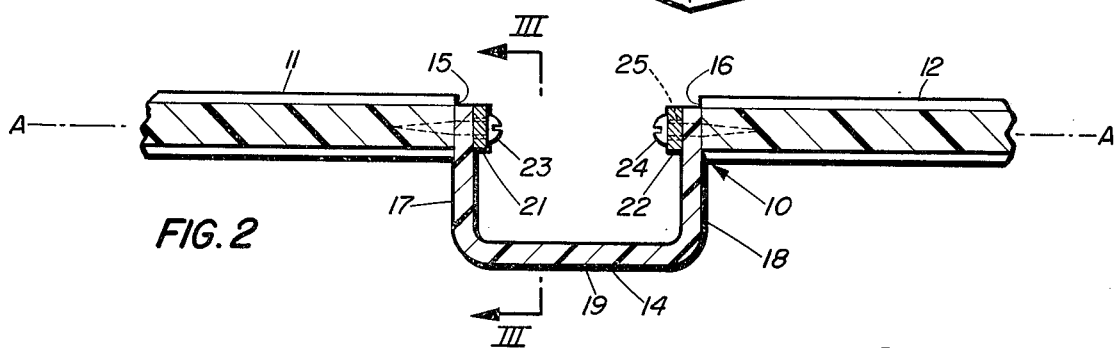
FIG. 2 is a horizontal sectional view of the joint taken on the line II—II of FIG. 1.

Referring to FIG. 2, which shows the cross-section along the line II—II of FIG. 1, it can be seen that the junction member 14 is provided with two legs 17 and 18 and a bight 19. The bight is a flat element that extends approximately at a right angle to the legs 17 and 18. The leg 17 lies against a planar end face 15 of the waterstop 11 and is held in place by a metal plate 21 and screws 23 which extend through apertures 25 in the plate. The leg 18 is also connected to a planar end surface 16 of the waterstop 12 by means of a plate 22 and screws 24. The surfaces 15 and 16 are generally in parallel-spaced relationship and the waterstops 11 and 12 lie in the same general plane A—A. The waterstops 11 and 12 are formed of a polymer, preferably of polyvinyl chloride (PVC) and the junction member is formed of the same elastomer material. The screws 23 and 24 are stainless steel, self-tapping screws which extend through the apertures 25 formed in the plates 21 and 22, respectively.

Figure 3:
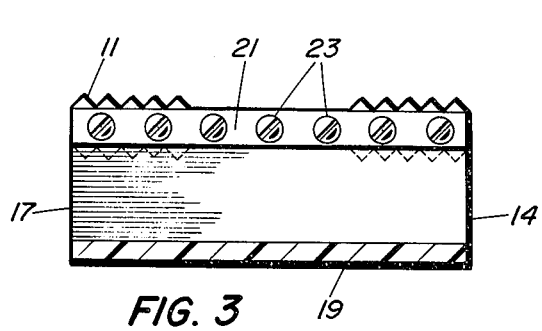
FIG. 3 is a vertical sectional view of the joint taken on the line III—III of FIG. 2.

In FIG. 3 is can be seem that the plate 21 is provided with apertures and screws 23 across the entire width of the waterstop 11 to provide a strong connection between the two.

The operation of the invention will now be readily understood in view of the above description. In setting up the concrete forms, the waterstops are suspended in place, usually by the use of wires connected to the reinforcing rods. As is evident in FIG. 1, the waterstops are arranged so that one-half of the waterstop resides in one pouring of the cement and the other half resides in the next adjacent pouring thus providing the desired function of preventing seepage of water through the junction between the two concrete pourings. As the waterstop 11 is extended from its roll, eventually the end is reached and it is necessary to attach it to the next adjacent waterstop. By use of the present invention, no heating, melting, gluing, cementing, or other means of fastening is necessary. It is simply a matter of laying a plate 21 against the inside surface of the leg 17 of the junction member, laying the outside surface of the leg against the end surface 15 of the waterstop 11, and applying the screws 23. Although apertures 25 are already formed in the plate 21, it may be necessary or desirable to drill lead holes through apertures in the plate, through the leg 17, and into the end of the waterstop in order to make it easier to apply the self-tapping screws 23. In order to apply the screwdriver to the screw 23, it is only necessary to bend the junction member 14 out of the way about the junction between the bight 19 and the leg 17. The other leg 18 is applied in a similar manner to the end surface 16 of the water stop 12. Here again, driving the screws 24 in place involves only bending the two waterstops at a slight angle using the junction member 14 (which is, or course, formed of an elastomer) for the bending purpose.

Figure 4:
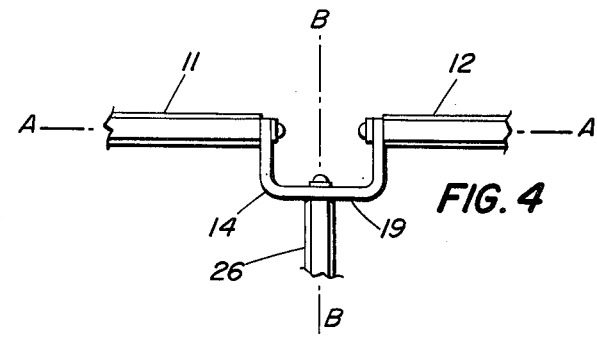
FIG. 4 is a plan view of a modified form of the joint.

FIG. 4 shows the manner in which a third waterstop 26 can be applied in plane B—B, this plane being at a right angle to the plane A—A. The waterstop 26 is similar to the first and second waterstops 11 and 12 in that it is formed of an elastomer and has and end surface which is fastened to the lower surface of the bight 19 of the junction member 14. A similar plate and screw arrangement is used. In this form of the invention the plane B—B is half-way between the end surfaces of the waterstops 11 and 12.

Figure 5:
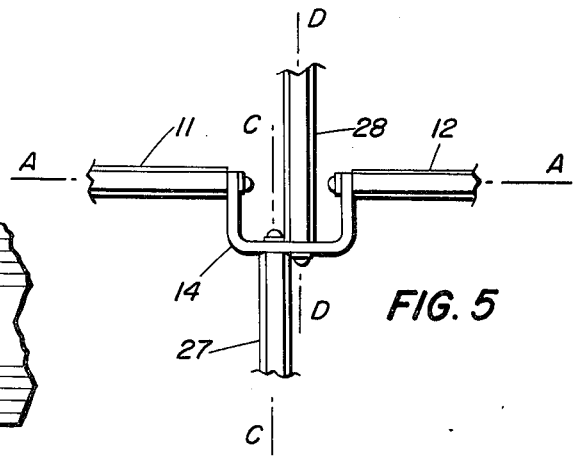
FIG. 5 is a plan view of a still further modified form of the joint.

Referring next to FIG. 5 it can be seen that a fourth elongated waterstop 28, which is similar to the first and second, waterstops 11 and 12, is applied to the bight of the junction member 14, along with a third waterstop 27. The waterstop 27 lies in a plane C—C, while the waterstop 28 lies in a plane D—D, the two planes being parallel to but spaced from one another and located centrally between the ends of the waterstops 11 and 12. The use of plates and screws to apply the end surfaces of the water stops 27 and 28 to the outer and inner surfaces, respectively, of the bight of the junction member 14 is evident.

Figure 6:
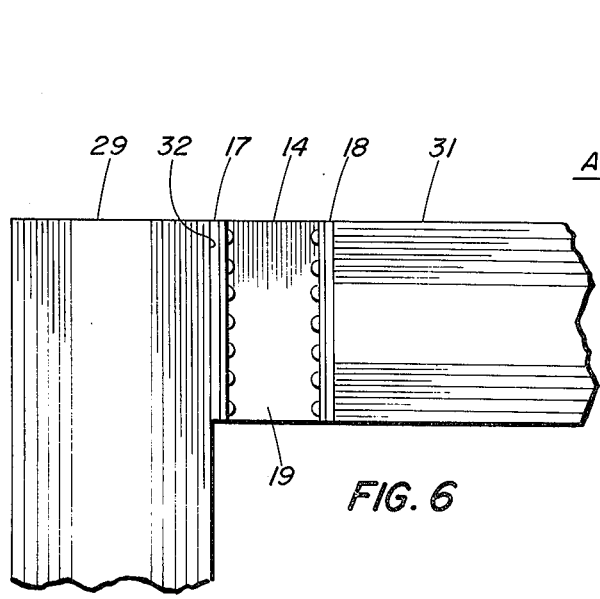
FIG. 6 is a plan view of a still further modification of the invention.

In FIG. 6 it can be seen that two waterstops 29 and 31 are fastened together by use of the same junction member 14. The leg 18 of the junction member is fastened to an end surface of the waterstop 31, while the leg 17 is applied to a side surface 32 of the water stop 29. The waterstops in this case lie in the same plane, but extend at a right angle to one another.

It can be seen from the demonstrations of the various configurations shown in FIGS. 4, 5, and 6 that the use of the single junction member 14 with its associated plates and screws enables the workmen to provide almost every kind of waterstop junction conceivable in the construction of concrete structures.

The advantages of the present invention will now be evident from the above description. First of all, it is not necessary for the workmen to have electricity or gas burners at the work site in order to heat up the ends of the waterstops, as was the old system. One can imagine the complications of the old system in trying to provide the type of crossjunction shown in FIG. 5, for instance. Secondly, it is only necessary for him to carry a number of the junction elements 14, which are all the same along a number of pre-apertured plates 21 and a supply of the stainless steel self-tapping screws 23. With these three elements and with a suitable screwdriving and drilling apparatus, he can make up any conceivable junction. In terms of time, the amount of labor necessary to assemble the present invention is substantially less than that required by the heating and welding procedure of the prior art. The junction members 14 are relatively inexpensive and the plates 21 and the screws 23 combine with it to provide a water-tight seal, which not only has high physical strength, but guarantees the waterproof nature of the joint.

It is obvious that minor changes may be made in the from and construction of the invention without departing from the material spirit thereof. It is not, however, desired to confine the invention to the exact form herein shown and described, but it is desired to include all such as property come within the scope claimed.

The invention having been thus described, what is claimed as new and desired to secure by Letters Patent is:

1. Waterproof joint comprising:
   (a) a first elongated waterstop formed of an elastomer material and having a planar end force surface extending at a right angle to the length,
   (b) a second elongated waterstop formed of an elastomer material and having a planar surface, the two waterstops being generally in the same plane with the surfaces in parallel, spaced relationship,
   (c) a junction member of U-shaped conformation formed of an elastomer material, the junction member having one leg fastened to one end surface and the other leg fastened to the other end surface, and
   (d) a metal plate lying along the surface of each leg which is opposite the surface of the leg that lies against the corresponding end surface, there being self-tapping screws extending through the plate and the junction member into the end of the waterstop.

2. Waterproof joint as recited in claim 1, wherein the plate is provided with apertures to receive the screws.

3. Waterproof joint as recited in claim 2, wherein the plate and the screws are formed of stainless steel.

4. Waterproof joint, comprising:

(a) a first elongated waterstop formed of an elastomer material and having a planar end force surface extending at right angle to the length,
(b) a second elongated waterstop formed of an elastomer material and having a planar surface, the two waterstops being generally in the same plane with the surfaces in parallel, spaced relationship,
(c) a junction member of U-shaped conformation formed of an elastomer material, the junction member having one leg fastened to one end surface and the other leg fastened to the other end surface, the bight of the junction member being flat and extending at a right angle to the legs, and
(d) a third elongated waterstop similar to the first and second waterstops which has its end surface fastened to one surface of the bight of the junction member.

5. Waterproof joint as recited in claim 4, wherein a fourth elongated waterstop similar to the first, second and third waterstops has its end surface fastened to the other surface of the bight with its plane displaced laterally from that of the third waterstop.

6. Waterproof joint, comprising:
(a) a first elongated waterstop formed of an elastomer material and having a planar end force surface extending at a right angle to the length,
(b) a second elongated waterstop formed of an elastomer material and having a planar surface, the two waterstops being generally in the same plane with the surfaces in parallel, spaced relationship, and
(c) a junction member of U-shaped conformation formed of an elastomer material, the junction member having one leg fastened to one end surface and the other leg fastened to the other end surface, the planar surface of the second waterstop being along one edge and parallel to the length, the two waterstops extending at a right angle to one another.

* * * * *